Dec. 27, 1927.

H. KOPPERS

WASTE HEAT BOILER SYSTEM

Filed July 7, 1921

H. KOPPERS 1,653,635

WASTE HEAT BOILER SYSTEM

Filed July 7, 1921

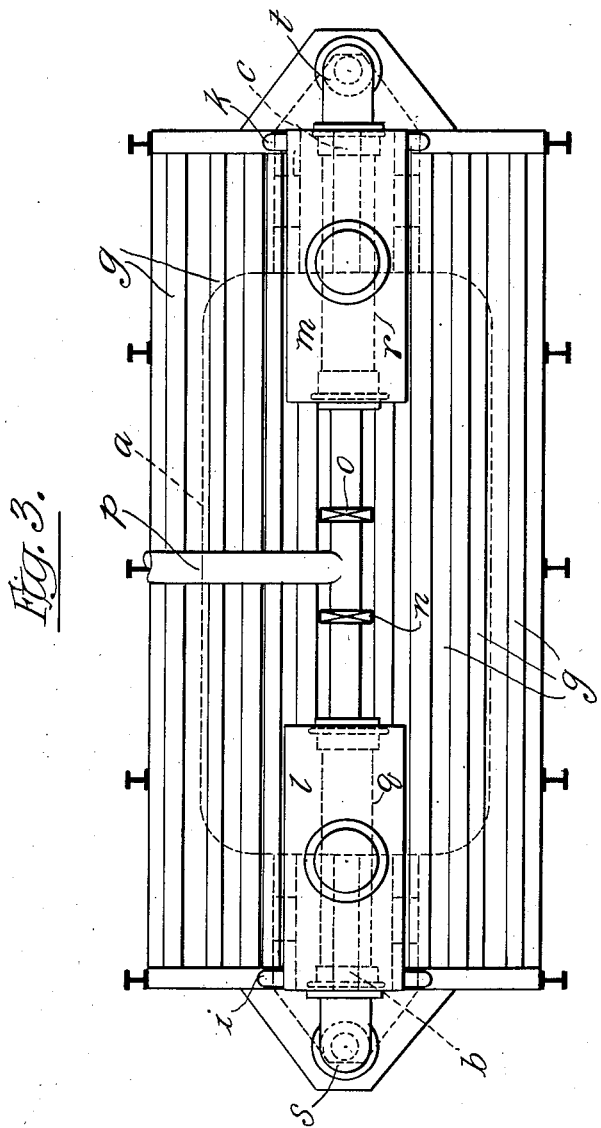

Patented Dec. 27, 1927.

1,653,635

UNITED STATES PATENT OFFICE.

HEINRICH KOPPERS, OF ESSEN-RUHR, GERMANY, ASSIGNOR TO THE KOPPERS DEVELOPMENT CORPORATION, OF PITTSBURGH, PENNSYLVANIA, A CORPORATION OF PENNSYLVANIA.

WASTE-HEAT BOILER SYSTEM.

Application filed July 7, 1921, Serial No. 483,052, and in Germany October 21, 1919.

The invention relates to hearth ovens or furnaces for melting steel, glass, and the like, with the object of utilizing the surplus heat of the same for steam production. By my improvements the surplus heat from the arch is availed of for this purpose and caused to cooperate with a part of the highly heated products of combustion from the hearth; with the further advantage that the regenerators are not overheated or damaged, and the excess heat, which is diverted from them for the purpose of conserving their structure, is not wasted; and with the further advantage that a relatively high steam pressure and super-heating are attained.

In spite of the use of careful heat insulation and skilfully carried out heat recovery, approximately 50% of heat is lost, owing to radiation and waste heat losses, in regenerative hearth ovens as well as steel melting ovens. It is well known to pass the waste heat gases from an oven first through regenerators thereof and then through a steam boiler plant; it is also well known to utilize the great heat radiating surfaces, particularly the arches of the ovens, for developing steam, by associating pipes or boilers with such radiating surfaces. An economical utilization of heat by either of these methods is not possible because, in the first method, the waste gases have been so reduced in heat in passing first through the regenerators that by the time the waste gases reach the steam boiler plant the temperature of the gases has been reduced so much that they do not have the high degree of heat necessary for producing steam of a certain pressure and for superheating such steam, and because, in the second method the radiant heat while possibly producing steam does not have the high degree of heat necessary for producing steam of high pressure and for superheating such steam. The lack of such high degree of heat, as is well known, is the reason why large quantities of heat of low degree, for instance the heat of the sun, cannot be utilized in a practical manner for industrial purposes. Now, the invention not only consists in using jointly the radiant heat from the oven and the heat from the waste gases, but also in bringing about the use of the latter source of heat in a special manner. As far back as the German Patent 196,532, it has been pointed out that the utilization of the waste heat for preheating fuels has entirely natural restrictions imposed on it owing to the limited capacity of the fuels to absorb heat, and for that reason the rule was laid down that a part of the waste heat be branched off at a high temperature stage and diverted from entry into the regenerators and used as separate effective heat. In this manner, what is practically the same heat surplus, is obtained but with a high degree of heat. This idea is also made use of in the present case by so connecting a steam boiler plant with the hearth or tub oven that both the radiating heat of the oven, particularly of the oven ceiling, and also the heat surplus of the waste heat which is branched off at any one time before entering the regenerators, are utilized for producing steam. This can take place in such a way that a preheater charged with water and exposed to the radiation of the oven arch is connected with a boiler which is heated with the said separated high degree heat, so that in the boiler a lively development of steam and, occasion arising, a superheating, take place by virtue of the higher degree of the utilized heat acting on the pre-heated water.

In the drawings a style of embodiment of the inventive idea is reproduced for the purpose of explanation, in which drawings—

Fig. 3 is a plan view of the same, the top enclosure or casing being removed.

Figure 1:
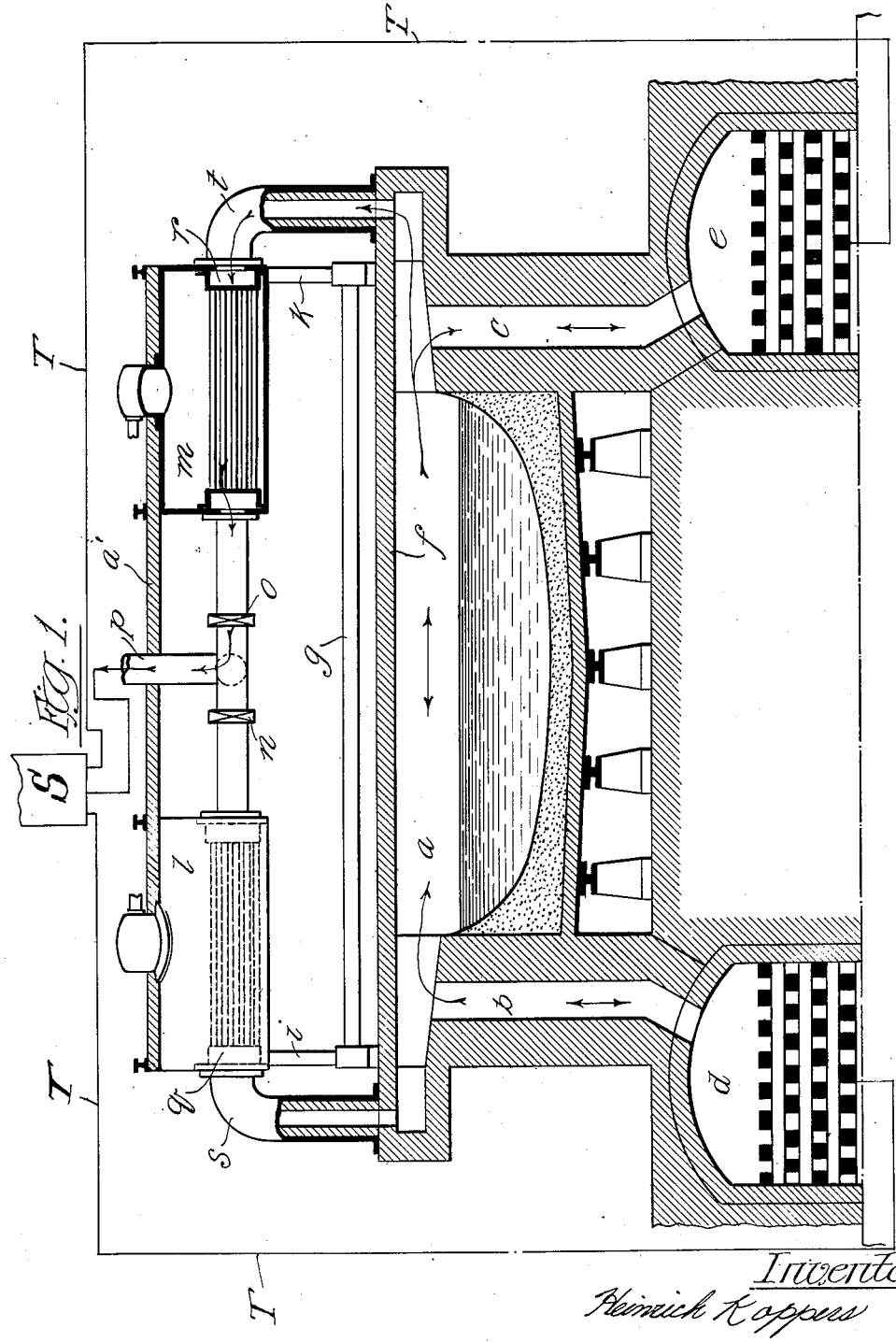
Fig. 1 is a longitudinal vertical section of a hearth oven and connected parts embodying the invention.
Figure 2:
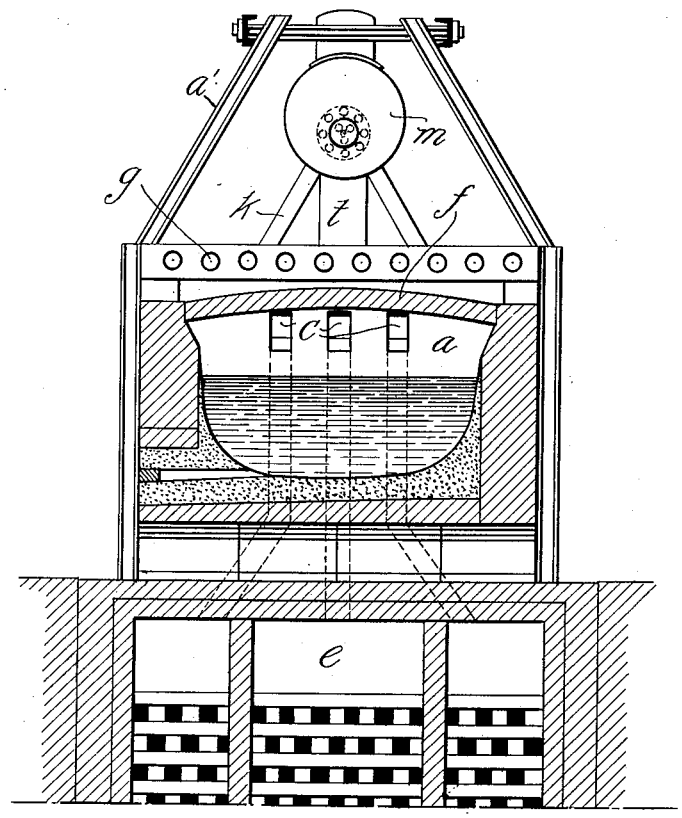
Fig. 2 is a vertical cross section of the same, the heat-retaining cover being omitted for clearness.

The hearth or tub oven $a$ is connected by the flues $b$ and $c$ with the regenerators $d$ and $e$ situated underneath the latter and serving in the well known manner at one time as air and gas heaters and at another as waste heat storers. When these functions are alternated, which happens about every half hour, the direction of the flame in the oven $a$ is reversed accordingly. On the oven arch $f$ the preheater $g$ in the form of a pipe grate is so supported that the water content in it is highly heated by the radiating oven heat. By the pipes $i$ and $k$ this preheater $g$ is connected with two boilers $l$ and $m$ the heat flues of which, by means of slides or valves $n$ and $o$, can be connected with or cut off from the main flue $p$ leading to the chimney. The fire boxes $q$ and $r$ of these boilers are provided with bent connections $s$ and $t$ leading from the hearth chamber $a$ so that, according to the position of the slides $n$ and $o$, a part of the waste heat is withdrawn directly through one of the boilers $l$ or $m$ to the chimney. On account of the high temperature of this waste heat—about 1000 degres—an energetic steam production can be effected.

The boiler plant in this connection is solidly connected with the foundation and upper enclosure $a'$ of the oven and conveniently contained therein in such a way that heat losses owing to conduction and radiation are avoided. For ovens which have their own movement, for instance tilting Martin ovens, the connections to the boiler are to be placed in such a way that this movement is rendered possible. This arrangement also has an advantageous effect as regards the hearth oven plant in itself in that the checkerwork of the regenerators acted on by the smaller quantity of gas, is less apt to be obstructed by flue dust, thus being made to last better and longer. Since, furthermore, the waste heat gases in the heat recovery plant are now also utilized more perfectly, they impart less heat to the alternatingly acting regenerators and other parts, so that the difficulties, hitherto caused by over-heating of the same are eliminated.

It will be understood that while either previously heated regenerator is heating the fuel which is on its way to the hearth, the other regenerator is connected as indicated diagrammatically at T with the chimney indicated diagrammatically at S and is being heated by such portion of the products of combustion as does not pass to the boiler; and the two regenerators and boilers function alternately in this manner.

What is claimed is—

1. In combination with a hearth oven; reversible regenerators communicably connected with said oven and operatively disposed into inflow and outflow groups; boilers; means for conducting a portion of the waste heat through said regenerators; means for conducting the surplus of said waste heat from the oven directly through said boilers; and a preheater exposed to and affected by the radiating heat of the oven, said preheater being connected with said boilers to supply preheated water to said boilers.

2. The combination of an oven, reversible regenerators communicably connected with said oven and operatively disposed into inflow and outflow groups, the connections between the regenerators and the oven constituting means for supplying fuel to said oven through said regenerators, a chimney, means for conducting products of combustion from the oven through said regenerators alternately to the chimney, boilers having heating flues, means for diverting from entering said regenerators portions of the products of combustion and causing them to pass through said boiler-heating flues, and a preheater heated by the oven and connected with said boilers to supply preheated water thereto.

3. In combination with a hearth oven: reversible regenerators communicably connected with said oven and operatively disposed into inflow and outflow groups; boilers adapted to be heated in alternation by waste gas from said oven; means for conducting a portion of the waste gas from the oven through said regenerators; means for conducting the surplus of such waste gas from the oven directly through said boilers; means for controlling flow through said last mentioned means; and a preheater exposed to and affected by the radiating heat of the oven, said preheater being connected with said boilers to supply preheated water to said boilers; said boilers and said preheater being solidly connected with the oven foundation and so associated therewith as to prevent loss of radiating heat irrespective of the hearth being fixed or movable.

4. The combination of an oven, reversible regenerators communicably connected with said oven and operatively disposed into inflow and outflow groups, the connections between the regenerators and the oven constituting means for supplying fuel to said oven through said regenerators, a chimney, means for conducting products of combustion from the oven through said regenerators alternately to the chimney, boilers having heating flues, means for diverting from said regenerators portions of the products of combustion and causing them to pass through said boiler-heating flues, a preheater heated by the oven and connected with said boilers to supply preheated water thereto; and an enclosure including the top of the oven and said boilers.

5. In combination with a hearth oven: reversible regenerators communicably connected with said oven and operatively disposed into inflow and outflow groups; a boiler having means for conducting thereto from said oven a portion of the waste heat which is thereby diverted from entering said regenerators; and a preheater outside of and near said oven and heated by the radiant heat therefrom and communicating with said boiler to supply preheated water thereto.

6. In combination with an open hearth oven, two sets of regenerators, a boiler associated with each set, two waste gas conduits extending from said oven, each conduit having a leg communicating with one of said sets of regenerators and a second leg communicating with and extending through the respective boiler, and means for controlling the flow through each of said second legs, and a preheater exposed to radiant heat from said oven and in communication with each of said boilers.

7. In combination with an oven: reversible regenerators communicably connected with said oven and operatively disposed into inflow and outflow groups; boilers; a preheater connected with said boilers to supply preheated water to said boilers, said preheater being exposed to and heated by the heat radiating from the oven, and means whereby said boilers may be heated by the separate effective waste heat of the oven which is diverted from entering the regenerators.

HEINRICH KOPPERS.